March 3, 1970     J. H. SHEPLEY     3,498,213
TWINE TENSIONING ATTACHMENT
Filed March 18, 1968     2 Sheets-Sheet 1

INVENTOR.
JOHN H. SHEPLEY
BY John E. Becker
ATTORNEY

March 3, 1970　　　　　J. H. SHEPLEY　　　　　3,498,213
TWINE TENSIONING ATTACHMENT
Filed March 18, 1968　　　　　　　　　　　　2 Sheets-Sheet 2

INVENTOR.
JOHN H. SHEPLEY
BY John E. Becker
ATTORNEY

United States Patent Office 3,498,213
Patented Mar. 3, 1970

3,498,213
TWINE TENSIONING ATTACHMENT
John H. Shepley, Lancaster, Pa., assignor to Sperry Rand Corporation, New Holland, Pa., a corporation of Delaware
Filed Mar. 18, 1968, Ser. No. 713,670
Int. Cl. B65b 13/08
U.S. Cl. 100—19       3 Claims

ABSTRACT OF THE DISCLOSURE

A twine tensioning attachment for a baling machine, having a pair of offset twine guides disposed between a twine box and a needle eye on a pivotal yoke, for movement therewith toward and away from a bale forming case, whereby tension is applied to the twine during a bale forming operation and on return of the needle to the home position from a knot tying operation because of the circuitous route taken by the twine through the tensioning attachment.

BACKGROUND OF THE INVENTION

This invention relates generally to a twine tensioning attachment for a baling machine, and specifically to the application of tension to the baler twine during the formation of the bale and as the needle returns to the home position after traversing the bale case during the knot typing operation.

During the twine tying or knotting operation of a baling machine, one end of the twine, the so-called number one strand, is held in a twine holder of a knotter mechanism. The twine strand then runs downwardly from the holder through the bale case to a needle, pivotally suspended below the bale case, through a needle eye and then to a twine box and a supply spool carried therein. As a bale is formed in the bale case, the twine extending across the bale case between the twine holder and the needle is forced, ahead of the forming bale in sharp jerks each time a hay charge is forced rearwardly in the bale case by a reciprocating plunger. Because of the jerk on the twine strand, the twine has a tendency to tangle or break and it is, therefore, important that tension be applied to the twine at this stage of the baling operation.

When the bale has been completely formed, the needle is actuated to travel upwardly through the bale case behind the newly formed bale carrying with it the strand of twine, the so-called number two strand, which passes through the needle eye. The needle travels to a twine holder portion of a knotter mechanism where the twine carried thereto is grasped so that both ends of the twine looped around the new bale are held therein. Immediately upon grasping the twine in the holder, a twine finger, operating in time relation with the needle, engages the needle carried number two strand and pulls it toward a billhook device of the knotter mechanism. Both ends of the twine are now against the billhook and it starts to rotate to form the knot therewith. It is essential that proper tension be applied to the bale twine at the time the needle carries the twine to the holder to be gripped thereby and as the other or so called number three strand is pulled back through the bale case after the typing operation. The number three strand then becomes the number one strand for the next bale to be formed. Without tension being applied to the number three strand, it has been found that the strand will not pull down soon enough after delivery of the number two strand to the knotter by the needle for the knotter to make a good knot. Such a condition may cause the knotter to fail to tie a knot and an untied bale will consequently be discharged from the machine.

Certain prior art attempts have been made to provide tensioning means for this purpose in a baler. These attempts have been less than satisfactory, one reason being that rather complex elements are brought into play. There has been a need for a tensioning device which is simple and inexpensive to manufacture and install and to maintain in the environment in which a baler normally operates.

SUMMARY OF THE INVENTION

Accordingly, the present invention provides a simple tensioning device which will provide adequate tension to the baler twine during the bale forming operation of the baler, and especially to the number three strand during the needle return stroke so that a good knot is formed. To this end, a pair of twine guides are connected in an offset manner to the needle yoke and the bale twine running between the supply spool and the needle is fed circuitously through the guides so that tension is applied to the twine by the guides.

DESCRIPTION OF DRAWINGS

Referring now to the drawings, FIGURE 1 shows a bale case 10, having a top wall 11, a bottom wall 12 and a plunger 13, reciprocable in the horizontally extending bale case. Mounted on top of bale case 10 is a star or metering wheel 14 disposed intermediate a shaft 15 which is rotatably mounted in pedestal bearings 16 connected to top wall 11 of the bale case. The upper wall 11 is suitably provided with openings therein (not shown) which permit the wheel 14 to extend downwardly into the bale case so that the wheel is rotated as it engages a bale (not shown) being formed beneath it by crop material forced rearwardly in the bale case by the plunger 13.

Figure 1:
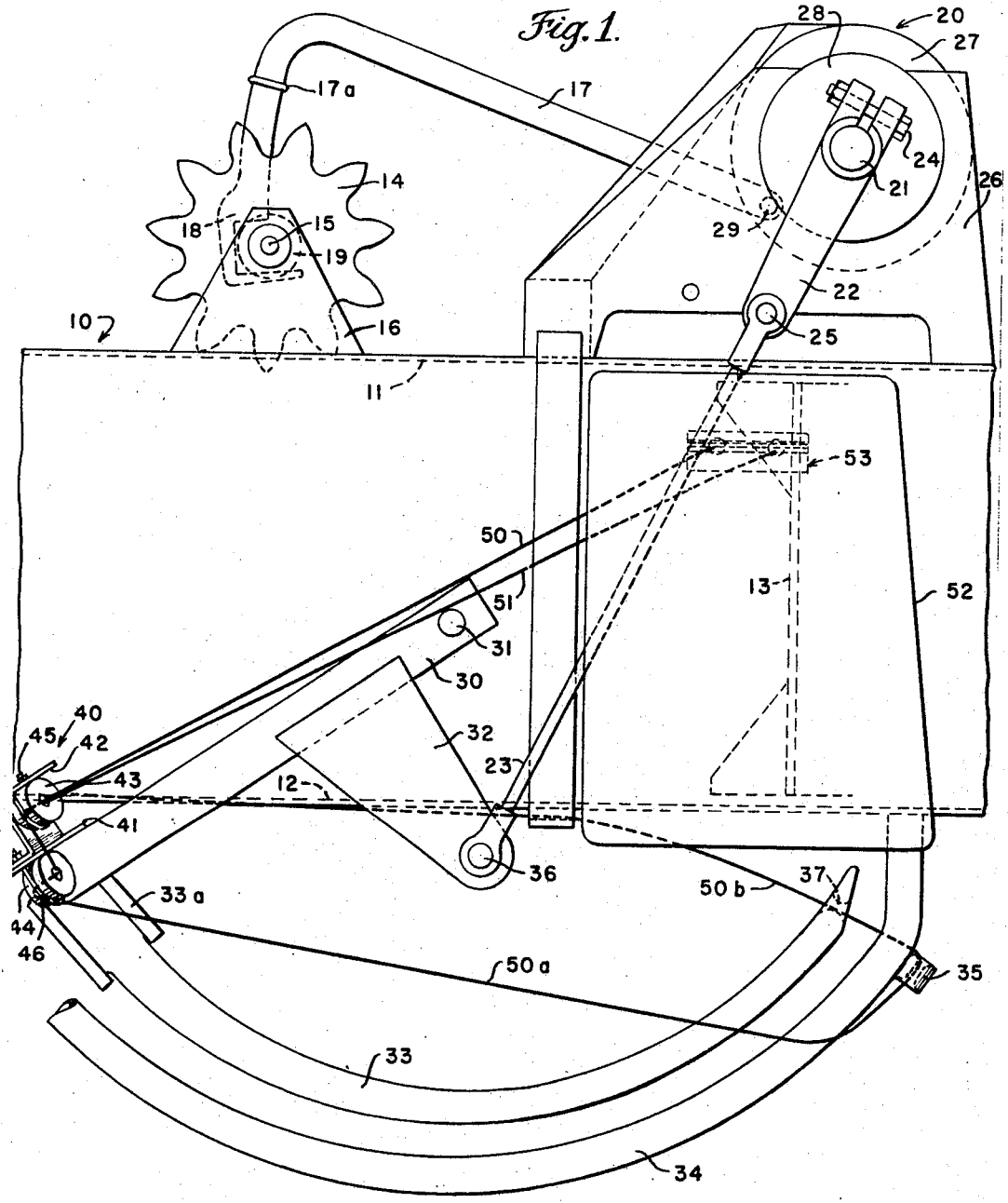
FIGURE 1 is a fragmentary side elevation view of the bale case and the associated needle, needle yoke and needle drive mechanism, and the twine tensioning attachment constructed according to the present invention.

An L-shaped trip arm 17 is provided with a collar 17a and a hooked end portion 18 at one end and a pivoted connection 29 to disk 27 at the other end. The hooked end 18 of arm 17 is adapted to extend over and against a trip roller 19 disposed on shaft 15 for rotation therewith. As the wheel 14 is rotated responsive to bale movement, roller 19 is correspondingly rotated. This rotation of roller 19 imparts a lifting motion to the trip arm 17 causing hooked portion 18 to assume the position shown in FIGURE 1, straddling roller 19. Trip arm 17 is adapted to be shifted forwardly (to the right in FIGURE 1) by spring means not shown and disk 27 is rotated to cause engagement of a conventional one revolution clutch means, generally indicated at 20.

The clutch means 20 is disposed on a horizontal timer shaft 21 which is supported by pedestal bearings 26 disposed on the upper surface of top wall 11. A crank arm 22 and a disk 28 are connected for rotation to one end of shaft 21, with crank 22 being secured by means of a clamp bolt 24, or any other suitable means. A rod element 23 is pivotally connected by one end at 25 to one end of crank arm 2, as shown in FIGURE 1. The other end of rod 23 is pivotally connected at 36 to a plate 32.

Figure 2:
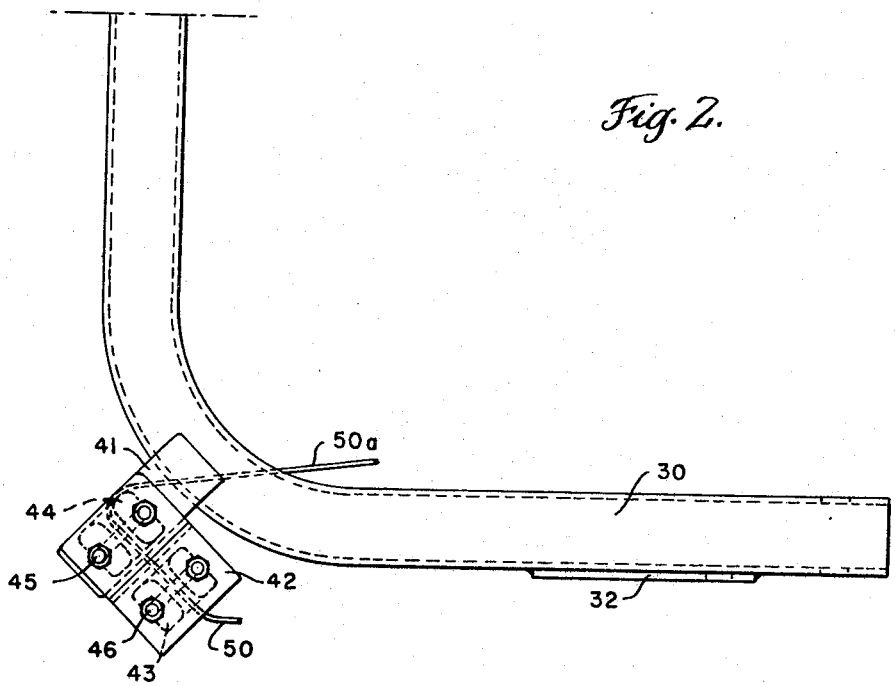
FIGURE 2 is a plan view of the needle yoke and twine tensioning attachment.
Figure 3:
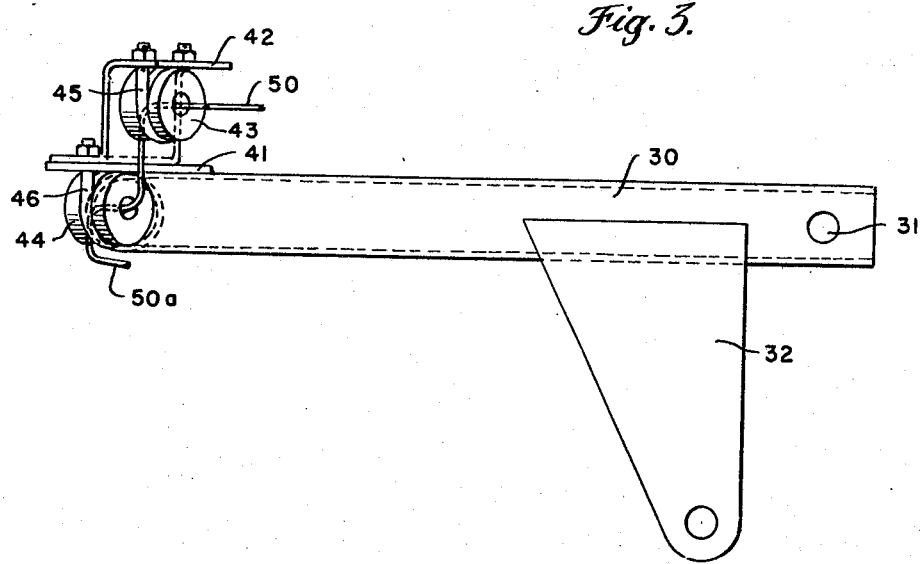
FIGURE 3 is a side view of the needle yoke and the twine tensioning attachment.

The plate 32 is tangentially secured, by suitable means (not shown), to a needle yoke 30, shown in FIGURES 1, 2 and 3 of the drawings. The tubular yoke 30 is substantially a U-shaped member, the bight of which extends parallel to the bottom wall 12 of the bale case and the legs of which extend parallel to the bale case side walls. Yoke 30 is pivotally connected to bale case 10 at 31, shown in FIGURE 1. A pair of arcuate needles 33 (only one shown) may be connected to the yoke by suitable mounting means 33a, as shown in FIGURE 1. Each needle 3 is protected by an arcuate guard member 34 which is connected at both ends to the under surface of bottom wall 12. A ceramic twine guide or eye 35 is disposed forwardly of the guard adjacent one end thereof.

A twine tensioning means 40 is secured to the yoke 30, as shown in FIGURES 1, 2 and 3. The tensioning means 40 is comprised of a plate element 41, fixed by one end to the yoke by any suitable means (not shown), a Z-shaped bracket 42 clamped to plate 41, a pair of ceramic guides or eyes 43 and 44, and a pair of U-bolts 45 and 46 for securing the guides 43 and 44 to the Z-bracket 42 and plate 41, respectively, as shown in FIGURES 2 and 3. The Z-bracket 42 is clamped to plate 41 by the bolt 46.

Figure 4:
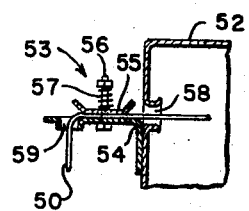
FIGURE 4 is a side view of the friction device on the twine box shown by the dotted lines in FIGURE 1.

Twine strands 50 and 51 are fed from a twine supply box 52 through a friction device 53 (FIG. 4) to tensioning device 40. Following in detail the path of twine strand 50, the strand is fed through guide 43 downwardly to guide 44, through the guide, exiting rearwardly as strand 50a, forwardly to guide 35, rearwardly through the eye 37 of needle 33, into the bale case 10, around the forward end of a bale (not shown) being formed, upwardly to top wall 11, along the wall forwardly and up out of the bale case beneath the clutch 20 to a twine holder of a knotter mechanism (not shown) where it is grasped.

Initially, strand 50b extends generally vertically across the bale case from the twine holder to the needle. This arrangement has not, however, been shown in detail in the drawings, because it is a standard baling operating procedure well known to those skilled in the art. As a bale is formed, the strand 50b is forced rearwardly (to the left of FIGURE 3) in the bale case ahead of the bale. At the same time, twine 50 is drawn out of the twine box 52 through friction means 53. The friction means 53, a standard feature on many balers, is comprised of an L-shaped bracket 54, fixed by one leg to twine box 52 adjacent aperture 58, and a clamp plate 55, positioned relative to bracket 54 by a bolt 56 and resiliently urged thereto by a biasing means such as a spring 57. A twine strand 50 is drawn from box 52 through aperture 58, between bracket 54 and clamp plate, and through an aperture 59 provided adjacent one end of bracket 54. The friction applied to the strand may be varied by varying the tension applied to biasing means 52 through rotation of bolt 56, but for the most part the friction means applied a constant drag to the twine during the entire baling operation once set.

After passing through the friction means, the twine strand 50 passes circuitously through the tensioning attachment, through guide 35 to the eye 37 of needle 33. Because of the circuitous path of the strand, a tension is applied thereto during the bale forming operation while the needles remain in the home position shown in FIGURE 1. The tension applied is greater than that which would be applied by the friction means alone.

When the formation of the bale is completed, the needles are actuated by the clutch device 20, in response to metering wheel 14, so that they begin the upswing through the bale case behind the formed bale to the knotter mechanism. There is no tension applied to the twine as the needle begins its upward travel through the bale case, because the tensioning means 40 is carried on and follows the needle. When the number two strand has been delivered to the twine holder (not shown), the number three strand is drawn downwardly through the bale case by the needle returning to the home position shown in FIGURE 1. On the return stroke tension is applied to the number three strand so that a loop formed between number two and number three strands at the knotter is pulled down quickly and with sufficient force to permit a good knot to be formed.

Having thus described my invention, what I claim is:

1. A twine tensioning attachment for use on a baling machine comprising, a longitudinally extending bale case having top and bottom walls, a metering wheel mounted above and extending into said bale case for engagement with bales being formed therein, a U-shaped yoke member pivotally connected to said bale case, a needle, having an eye therein, connected to said yoke for pivotal movement therewith with respect to said bale case, a tensioning means mounted on said yoke for movement therewith, said tensioning means comprising a pair of tubular guide members connected to said yoke member one above the other in a laterally offset manner, a twine box mounted on said baling machine adjacent said bale case, and means on said bale case connected to said metering wheel and said yoke for actuating said needle in response to movement of said metering wheel whereby tension is applied to twine fed from said twine box, through said offset tubular guide members, to said needle eye and upwardly through said bale case as said yoke and needle are returned through said bale case after a knotting operation.

2. A twine tensioning attachment for use on a baling machine comprising, a longitudinally extending bale case having top and bottom walls, a metering wheel mounted above and extending into said bale case for engagement with bales being formed therein, a U-shaped yoke member pivotally connected to said bale case, a needle, having an eye therein, connected to said yoke for pivotal movement therewith with respect to said bale case, a tensioning means mounted on said yoke for movement therewith, said tensioning means comprising a plate element connected by one end to said yoke, the other end extending away from said yoke, a Z-shaped bracket connected to the upper surface of said plate element by one leg thereof, a first ceramic guide member suspended below the other leg of said Z-bracket, and a second ceramic guide member suspended below said plate, adjacent said yoke, a twine box mounted on said baling machine adjacent said bale case, and means on said bale case connected to said metering wheel and said yoke for actuating said needle in response to movement of said metering wheel, whereby tension is applied to twine fed from said twine box through said first guide, downwardly and through said second guide member and thence to said needle eye and upwardly through said bale case as said yoke and needle are returned through said bale case.

3. A twine tensioning attachment for use on a baling machine comprising, in combination, a longitudinally extending bale case having top and bottom walls, a reciprocating plunger in said bale case, a metering wheel mounted above and extending into said bale case for rotatable engagement with bales being formed therein, a U-shaped yoke member pivotally connected to said bale case, a needle, having an eye therein, connected to said yoke for pivotal movement therewith with respect to said bale case, a tensioning means mounted on said yoke for movement therewith, said means comprising a plate connected tangentially by one end to said yoke, the other end extending away from said yoke, a Z-shaped bracket connected to said plate by one leg thereof, said bracket extending upwardly from said plate, a first ceramic guide member suspended below the other leg of said Z-shaped bracket, and a second ceramic guide member suspended below said plate, a twine box mounted on said baling machine adjacent said bale case, and means on said bale case connected to said metering wheel and said yoke for actuating said needle in response to movement of said metering wheel, whereby tension is applied to baling twine fed from said twine box through said first guide through said second guide and thence to said needle eye as said yoke and needle are returned through said bale case to a rest position.

References Cited

UNITED STATES PATENTS

| | | | |
|---|---|---|---|
| 1,213,993 | 1/1917 | Zachow | 100—19 |
| 2,080,316 | 5/1937 | Innes | 100—19 XR |
| 2,495,442 | 1/1950 | Canady | 242—153 XR |
| 2,897,747 | 8/1959 | May | 100—4 |

BILLY J. WILHITE, Primary Examiner